Sept. 21, 1965          G. AUBERT          3,206,798
MECHANIZATION DEVICE FOR ABATTOIRS
Filed Feb. 26, 1964
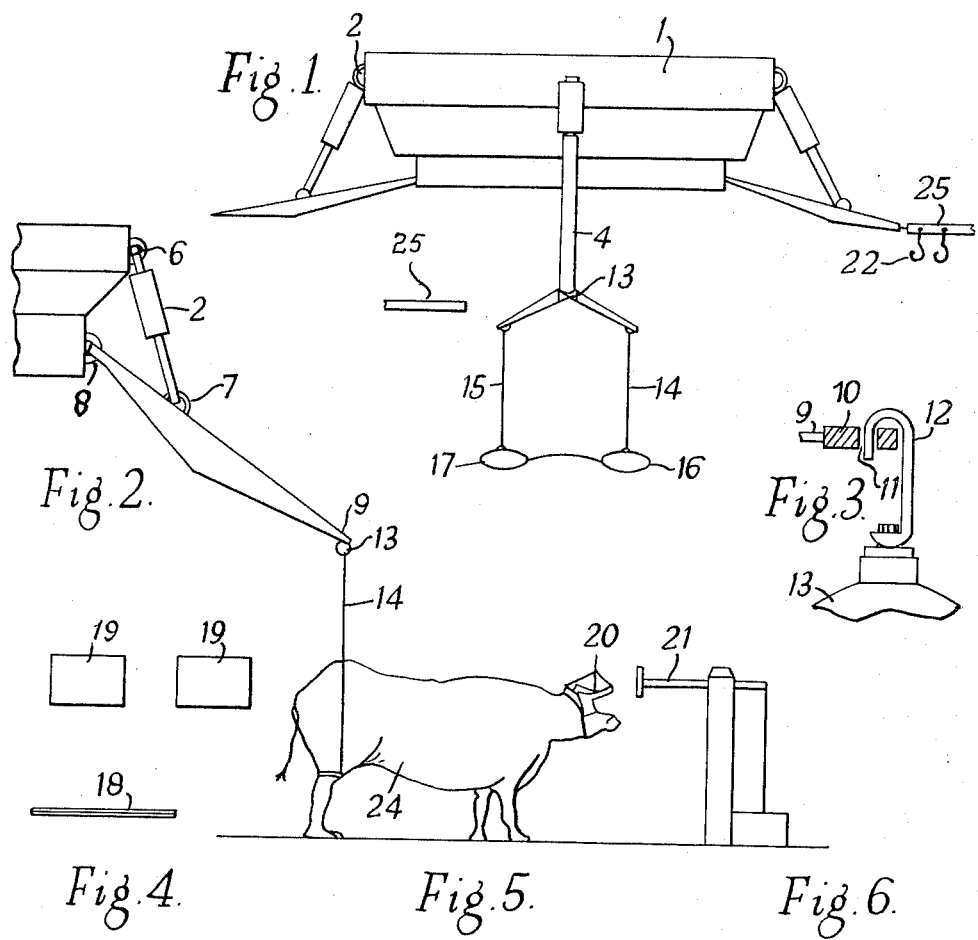
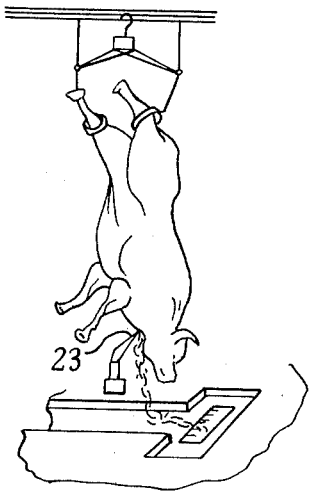
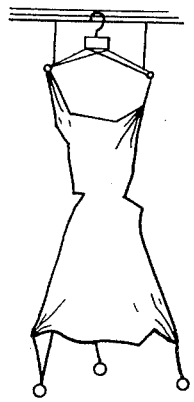
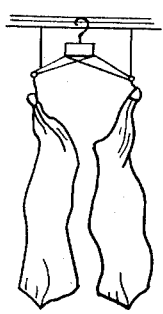
INVENTOR:
GEORGES AUBERT official# United States Patent Office 3,206,798
Patented Sept. 21, 1965

3,206,798
MECHANIZATION DEVICE FOR ABATTOIRS
Georges Aubert, 6 Rue Pierre Dupre, Marseilles, France
Filed Feb. 26, 1964, Ser. No. 347,577
Claims priority, application France, Mar. 4, 1963,
26,077, Patent 1,348,998
2 Claims. (Cl. 17—24)

The object of the invention is to provide an apparatus for performing semi-automatically and mechanically all slaughtering operations, starting from the hindquarters, to the storing of the quarters, the entire system making it possible to prevent frauds with regard to the quality of the meat and to obtain an increased output, even without highly skilled personnel.

It is characterised by the means employed, considered both in conjunction with one another and independently of one another, and more particularly by the device by which the animal is slaughtered and then raised, this device consisting of a rotating support with operating-levers actuated by jacks, and bracket-supports with collars for securing the legs of the animal, which, once it has been slaughtered, is lifted into the customary position, to be taken via a conveyor rail to the point where it is bled, skinned, eviscerated, weighed, and cut into two parts. At the end of the process the carcass is conveyed, again mechanically, to the place where it is to be stored.

In the accompanying drawings, illustrating a constructional example of the invention, without any limitative effect:

FIG. 1 is an elevation of the slaughtering and lifting apparatus;

FIG. 2 illustrates the basic apparatus as a whole;

FIG. 3 is a view, on a different scale, of the load-bearing end of the operating-lever;

FIGS. 4, 5 and 6 are schematic diagrams of examples of the various operating stages together with the slaughtering device.

The positioning machine consists of a rotatable circular support 1 with surfaces for affixing hydraulic jacks 2, placed on the vertical periphery, and operating levers or arms 4. The jacks are mounted on the support and operably connected to the levers.

The jacks 2 are linked at points 6 and 7, while the levers or arms 4 are mounted on articulated bearings 8.

The extremity 9 of the operating levers includes a supporting device consisting of a part 10 with an orifice 11 accommodating a hook 12 which supports a double sided bracket 13, of which the ends are connected by cables 14 and 15 to twin collars 16 and 17 firmly enclosing the hindquarters of the animal. These collars may either be connected together or separate.

The various items of apparatus include, as shown in FIG. 2, a weighing platform 18, two X-ray units 19 for the examination of the front and hind quarters, and the slaughtering device, consisting of a mask, with the cartridge pistol 20, set in operation by the striker 21.

As soon as the animal has been killed, the lever 3 shown in FIG. 2 ascends, and the carcass is suspended in the dismemberment and bleeding position, and the hook 12 is engaged by the support means 22 of the conveyor rail 25 and conveyed to the different operating-stations. FIG. 4 shows the bleeding station 23, FIG. 5 showing the skinning operation and FIG. 6 the evisceration and cutting-up operation.

The rail carriage conveys the quarters to the cold storage.

This device offers numerous advantages.

In the example illustrated, the animal, as soon as it enters the abattoir, is weighed on the scales 18, and its forequarters and hindquarters are X-rayed, in order to verify its condition of health. The slaughtering mask with its piston is then put on the animal, which is placed in front of the striker 21, which, when the striking surfaces moves forward, operates the pistol, so that the animal is stunned.

The operating lever 4 ascends and the carcass is suspended by the hindquarters on the bracket 13. The entire system is then raised until the arm 4, as shown in FIG. 1, is level with the conveyor rail 25, which conveys the carcass to all the operating stations.

The twin collars 16 and 17 enable the carcass to be positioned as desired. The carcass is then conveyed, via the rail 25, to the bleeding post, FIG. 4, where the throat is cut in the customary manner by a jack-operated tilting knife.

This operation is followed by the skinning, as shown in FIG. 5, and by the evisceration and traditional separation into two parts, as shown in FIG. 6.

Over the route followed, weighing and X-raying and other operations are carried out, up to the point where the carcass enters the cold storage.

With a medium-sized installation of this kind, up to sixty carcasses can be disposed of hourly, and the mechanization not only prevents suffering on the part of the animal but also the risk of injury to the personnel, whose task is simplified.

Fraud is likewise prevented, and the quarters thus prepared can be fed into the machines used for the mechanical separation of the front and hind parts, for sale to the meat trade.

The invention is thus characterised by the apparatus used for the slaughtering, lifting and initial positioning of the animal, but the shapes, dimensions and arrangements adopted for the various parts of the apparatus may vary, within the limits allowed by equivalent devices, as may also the materials used for their manufacture, without thereby departing from the general principle of the invention described in the foregoing.

I claim:

1. Apparatus for the handling of slaughtered animals comprising a rotatable support, a plurality of levers each pivoted and connected at one end to spaced points of said support and extending outwardly from said support, each lever including means connected thereto for raising and lowering said levers with respect to said support, the other end of said levers having mounted thereon a two arm bracket coupled to each lever, a hindquarters tackle cable connected at one end to each arm of said bracket and a rear leg encircling element at the other end of each cable.

2. Apparatus, as claimed in claim 1, in combination with a slaughtering device and a conveyor having support means, the slaughtering means being disposed at a first rotary station of the support, in which a lever can be raised to lift the hindquarters tackle and raise the carcass, the conveyor being positioned at a second rotary station at which the hindquarters tackle and its carcass is transferred to a support means of the conveyor for transportation to stages of bleeding, evisceration and dismemberment.

References Cited by the Examiner

UNITED STATES PATENTS

| 94,896 | 9/69 | Ketchledge | 17—24 X |
| 661,637 | 11/00 | Farrell. | |
| 3,113,340 | 12/63 | Bush et al. | 17—1 |

FOREIGN PATENTS 594,457   3/34   Germany.

SAMUEL KOREN, Primary Examiner.

LUCIE H. LAUDENSLAGER, Examiner.